May 13, 1930.　　　　　F. R. LONG　　　　　1,758,844
COMBINED CHUCK AND BRAKE MECHANISM
Filed June 4, 1929　　　2 Sheets-Sheet 2
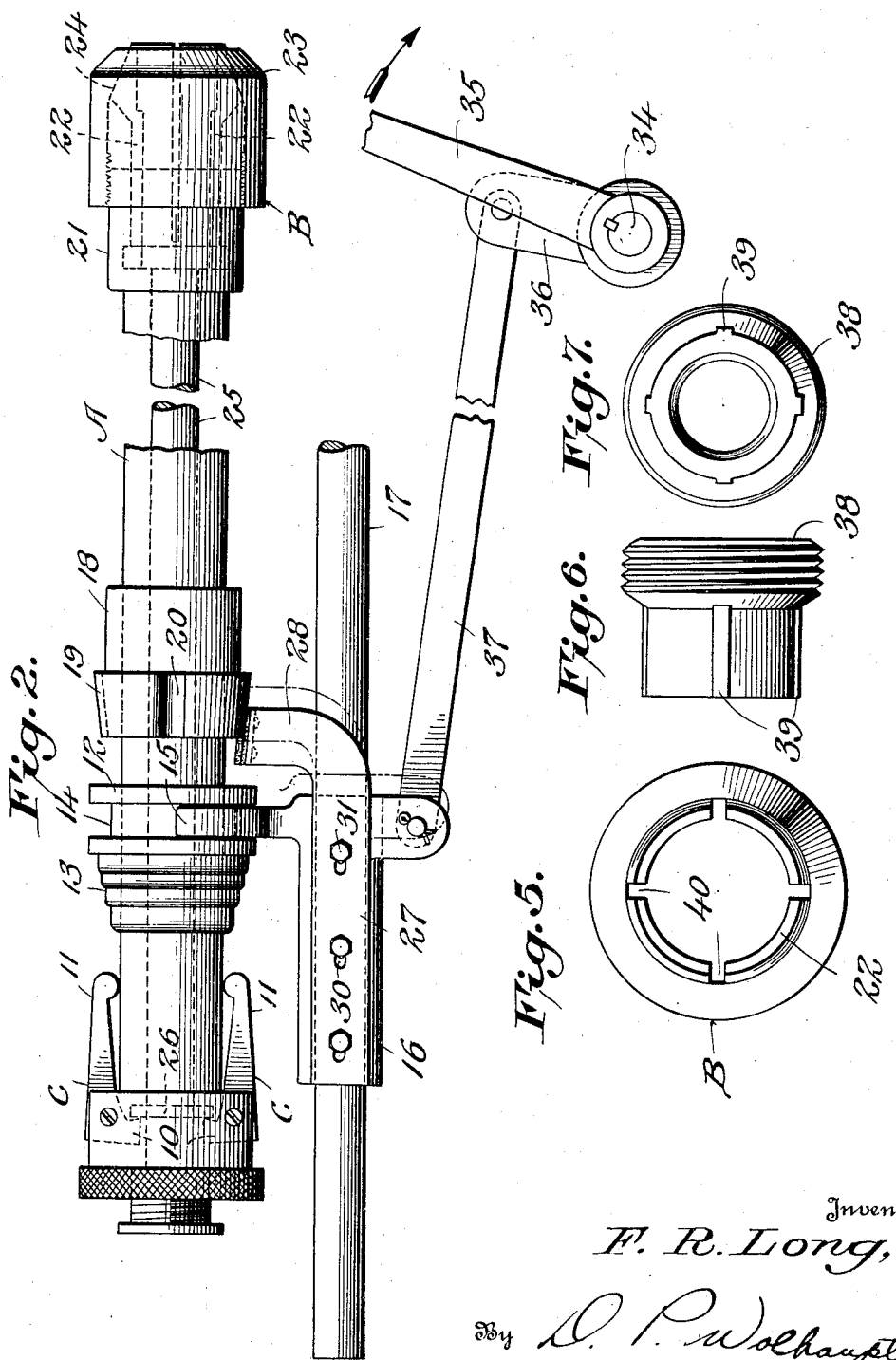
Inventor
F. R. Long,
By D. P. Wolhaupter
Attorney Patented May 13, 1930

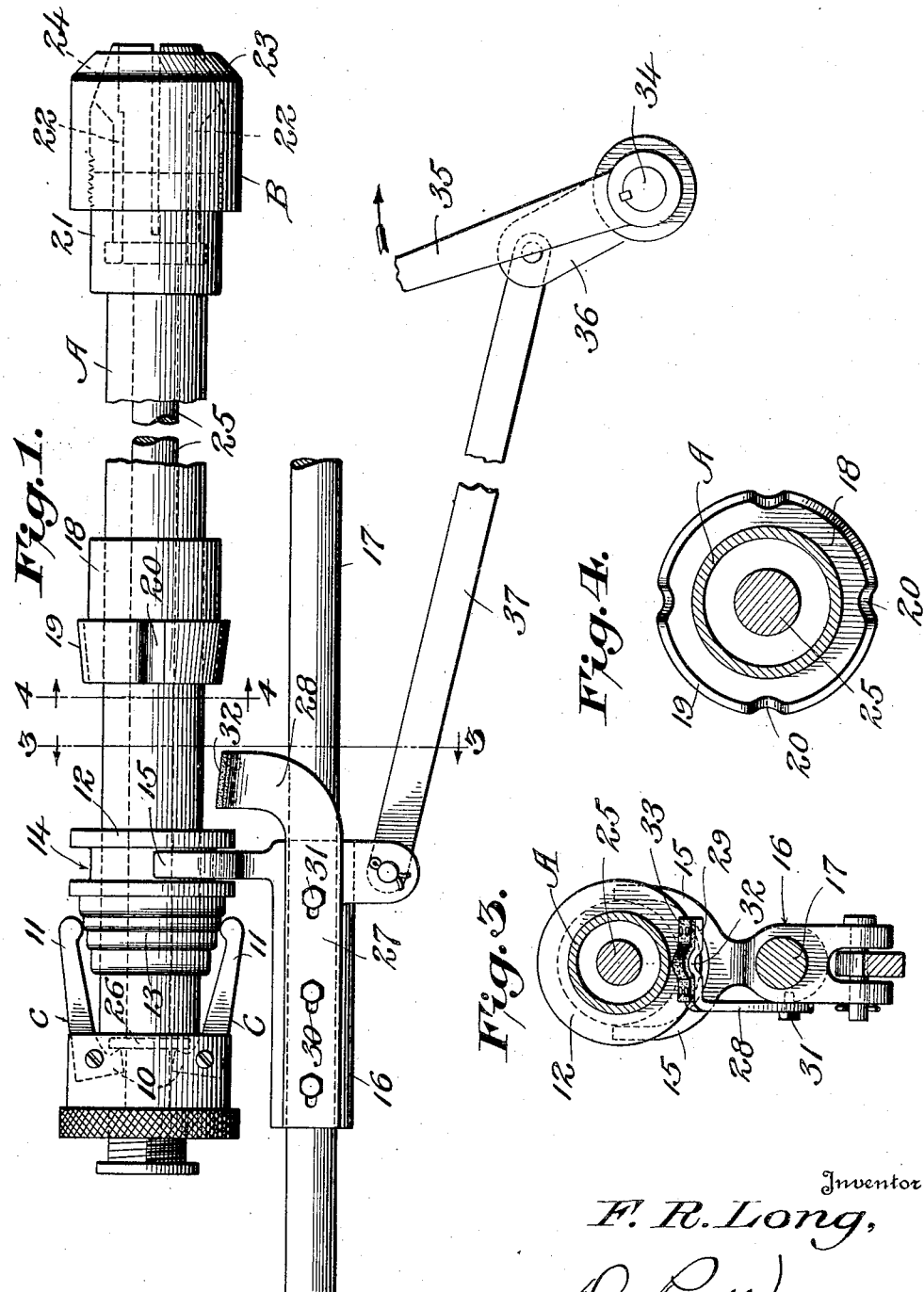

1,758,844

UNITED STATES PATENT OFFICE

FRED R. LONG, OF CATAWISSA, PENNSYLVANIA

COMBINED CHUCK AND BRAKE MECHANISM

Application filed June 4, 1929. Serial No. 368,279.

This invention relates to a combined chuck and brake mechanism, and has for its general object to provide means, capable of general application, whereby movement of a control member to one position releases the brake and applies the chuck, and to another position applies the brake and releases the chuck.

More particularly it is the purpose of the present invention to provide a simple, inexpensive, reliable and efficient mechanism for incorporation in a screw machine to arrest rotation of a chuck carrying spindle and to simultaneously release the chuck, or, vice-versa, to actuate the chuck into holding engagement with an object and to simultaneously release the chuck spindle for rotation, all with a view to enabling maximum production in a minimum amount of time and with minimum effort on the part of the person operating the machine.

Also the invention has in view to provide, in a starting and stopping mechanism as set forth, means for stopping the chuck in a predetermined position of rotation to facilitate engagement therewith of an object to be held thereby.

With the foregoing and other objects in view, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Fig. 1 is a side elevation of mechanism constructed in accordance with the invention, illustrating the relative position of the parts when the chuck is engaged with an object and the chuck spindle is released.

Fig. 2 is a view similar to Fig. 1 showing the relative position of the parts of the mechanism when the chuck is released and the brake is applied.

Fig. 3 is a section on the line 3—3 of Fig. 1.
Fig. 4 is a section on the line 4—4 of Fig. 1.
Fig. 5 is an end view of the chuck.
Fig. 6 is a side elevation of an object which is adapted to be held and rotated by the chuck to enable a machine operation to be performed thereon; and Fig. 7 is an end view of the object shown in Fig. 6.

Referring to the drawings in detail, A designates a hollow spindle carrying at one end a chuck, designated generally at B, and provided at another point with one or more bell crank levers C, the short arms 10 of which extend into the interior of said spindle and the long arms 11 of which are disposed contiguous to the outer face of said spindle.

Slidable on the spindle A is a collar 12, provided with a stepped, generally conical portion 13 for cooperation with the long arms 11 of the bell-crank levers C, and also provided with an annular groove 14 to receive the fork arms 15 of a collar shifting member 16, which latter is mounted for sliding movement on a rod 17 supported in any suitable manner parallel to the spindle A.

Formed either integrally with the spindle A, or separate therefrom and fixed thereto in any desired manner is a boss or collar 18 which is inclusive of an annular portion 19 tapered in the direction of the collar 12 and provided with one or more longitudinally extending grooves or recesses 20.

The chuck B may be of any preferred type and construction which is inclusive of gripping jaws which are effective, when moved longitudinally outward, to contract upon and grip an object disposed between them. In the present instance said chuck consists of a hollow body 21 having arranged therein for longitudinal movement a plurality of jaws 22. A cap member 23 is threaded on the body 21 and this cap member and the jaws 22 are provided with cooperating inclined or wedge surfaces 24 so arranged that by moving the jaws outward relative to the cap member said jaws are contracted, that is, moved radially inwardly towards one another so as to grip an object disposed between them.

Mounted in any suitable manner for longitudinal sliding movement within the spindle A is a push rod 25, one end of which is arranged to cooperate in any suitable manner with the inner ends of the chuck jaws 22 to impart outward movement to said jaws. On said rod is a flange 26, disposed for engagement by the short arms 10 of the bell-crank levers C.

Secured to the shift member 16 is a brake element 27 in the form of a plate having an end portion 28 thereof bent inwardly toward the spindle A and then extended laterally as indicated at 29 in Fig. 3 of the drawings for cooperation with the member 18. Slots 30 are formed in said plate to receive the screws 31 employed to secure said plate to the shift member 16 whereby said plate may be adjusted relative to the member 18, and, for a purpose which will presently appear, the portion 29 of said plate, which preferably is resilient, is provided with an inwardly directed protuberance 32 and faced with suitable friction material 33.

Mounted on a shaft 34 for arcuate swinging movement is a control member in the form of a lever 35, positioned for convenient manipulation by the operator of the machine in which the foregoing mechanism is embodied. On the shaft 34 is fixed an arm 36, and connecting this arm with the shift member 16 is a link 37.

As aforesaid, the collar 12 is adapted for cooperation with the bell-crank levers C and the portion 29 of the plate 27 is adapted for cooperation with the member 18. When the collar 12 is shifted to the left from the position of Fig. 2 to the position of Fig. 1 the stepped portion 13 thereof is adapted to engage the long arms 11 of the bell-crank levers C and swing them outward. On the other hand, when the shift member is moved to the right from the position of Fig. 1 to the position of Fig. 2, the collar 12 not only is adapted to be moved free of the bell-crank arms 11 to permit same to swing inward, but the portion 29 of the plate 27 is adapted to be engaged with the portion 19 of the member 18. To this end it will be observed that the parts referred to are so spaced that when the shift member 16 is moved to the right from the position of Fig. 1 the collar 12 becomes disengaged from the bell-crank arms 11 before the portion 29 of the plate 27 engages the face 19 of the member 18, engagement of the portions 29 and 19 occurring immediately following disengagement of said collar from said bell-crank arms. The adjustment afforded by the slots 30 enables this operation readily to be predetermined.

The spindle A is adapted to be driven, i. e., rotated in any desired manner. For example, it may be directly driven by an electric motor, or indirectly by gears or by a belt. Thus, assuming the power to be cut off from said spindle and the parts of the mechanism to be in their positions shown in Fig. 2 of the drawings, the operation is apparent and as follows:

An object to be operated upon is engaged between the chuck jaws 22 and the lever 35 is swung to the left, bringing the parts of the mechanism into the relation shown in Fig. 1. That is, the shift member 16 is moved to the left along its supporting or guide rod 17 and the portion 29 of the plate 27 is disengaged from the member 18 and the portion 13 of the collar 12 is moved between the bell-crank arms 11, forcing them outward. As said arms 11 are forced outward the short arms 10 as a consequence press forcibly against the flange 26 and push the rod 25 to the right as viewed in the drawings. This results in the chuck jaws 22 being pushed to the right with consequent cooperation of the inclined faces 24 to contract said jaws into clamping engagement with an object positioned therebetween. Thus, the spindle is free to be rotated and the object is clamped securely by the chuck for rotation with the spindle. Power may then be applied to the spindle to rotate same over any desired period of time to enable a desired operation to be performed on the object gripped by the chuck. Upon completion of the operation on the object, power is cut off from the spindle and the lever 35 may immediately be swung to the right as viewed in the drawings. This results, first, in withdrawing the collar 12 from engagement with the bell-crank arms 11 to enable the push rod to move to the left and thus remove the clamping pressure of the jaws 22 from the object held therebetween. Immediately following, the friction material 33 on the portion 29 of the plate 27 engages the face 19 of the member 18 and brakes the spindle A, the resiliency of the portion 29 serving to compensate to a considerable extent for varying pressures exerted upon the lever 35 so that although the spindle A may be brought to a relatively quick stop, it is difficult if not impossible so to jam the brake as to bring the spindle to such a sudden or harsh stop as possibly to harm the mechanism. The resiliency of the plate portion 29 moreover serves the more important purpose of projecting the protuberance 32 into one of the grooves or recesses 20 when rotation of the spindle is about to cease, thus stopping the spindle in a predetermined position of rotation. This is important for this reason: Some articles such, for example, as the pipe union element 38 illustrated in Figs. 6 and 7 of the drawings, are formed with longitudinally extending ribs 39. One of the particular purposes of the present mechanism is to spin such elements to effect threading thereof by suitable dies (not shown), and to facilitate engagement of such articles between the chuck jaws 22 with the ribs 39 disposed within the spaces 40 between adjacent jaws, it is desirable that the chuck should always be stopped with the jaws 22 in a predetermined position of rotation so that the operator may know exactly how to hold the element 38 to aline the ribs 39 with the spaces 40. The jaws 22 and the spaces therebetween correspond in number to the number of ribs 39 on the elements 38. Said ribs and said spaces are evenly spaced circumferentially, and the grooves or recesses 20 correspond in number to the spaces between the jaws 22, and are respectively alined with said spaces. Thus, regardless of which groove 20 is engaged by the protuberance 32 the chuck always will be stopped in a predetermined position of rotation such that the operator, without looking at the chuck, may know exactly in what position to hold an element such as the element 38 to enable same to be inserted into the chuck.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In mechanism of the class described, a spindle, a chuck and a brake element carried by said spindle, a chuck actuator slidable on said spindle, a shift member for sliding said chuck actuator, and a brake element movable in unison with said shift member for cooperation with said spindle carried brake element.

2. In mechanism of the class described, a spindle, a chuck and a brake element carried by said spindle, a chuck actuating collar shiftable on said spindle, a shift member for sliding said collar, a brake element carried by said shift member for cooperation with said spindle carried brake element, and means connecting said second mentioned brake element to said shift member for adjustment relative thereto.

3. In mechanism of the class described, a spindle, a chuck carried thereby inclusive of a plurality of gripping jaws, a brake element carried by said spindle inclusive of a plurality of recesses corresponding in number to the number of said gripping jaws and disposed in predetermined relation to said jaws respectively, and a second cooperating brake element having a protuberance for engagement in one of said recesses.

4. In mechanism of the class described a spindle, a chuck carried thereby inclusive of a plurality of gripping jaws, a brake element on said spindle, a cooperating brake element, positive stop formations on said spindle carried brake element disposed in predetermined relation to said gripping jaws, and a cooperating positive stop formation on said second mentioned brake element.

In testimony whereof I hereunto affix my signature.

FRED R. LONG.